(12) United States Patent
Karem (10) Patent No.: US 7,731,125 B2
(45) Date of Patent: Jun. 8, 2010

(54) COMPACT STOWAGE OF TRANSPORT AIRCRAFT

(76) Inventor: Abe Karem, 1018 Timberline La., N. Tustin, CA (US) 92705

(*) Notice: Subject to any disclaimer, the term of this patent is extended or adjusted under 35 U.S.C. 154(b) by 0 days.

(21) Appl. No.: 12/399,206

(22) Filed: Mar. 6, 2009

(65) Prior Publication Data

US 2009/0224098 A1 Sep. 10, 2009

Related U.S. Application Data

(60) Provisional application No. 61/034,463, filed on Mar. 6, 2008.

(51) Int. Cl.
*B64F 1/00* (2006.01)
(52) U.S. Cl. .................................. 244/114 R
(58) Field of Classification Search ............. 244/114 R, 244/102 SS, 104 FP, 17.17, 49; 416/142; 414/227–230
See application file for complete search history.

(56) References Cited

U.S. PATENT DOCUMENTS

| | | | |
|---|---|---|---|
| 1,870,744 A * | 8/1932 | Pierson | 414/242 |
| 2,692,095 A * | 10/1954 | Carpenter | 244/50 |
| 2,933,271 A * | 4/1960 | Maltby | 244/103 R |
| 3,182,931 A * | 5/1965 | Mil et al. | 244/17.17 |
| 3,489,297 A * | 1/1970 | Jenkins et al. | 414/234 |
| 3,670,464 A * | 6/1972 | Cutter | 52/30 |
| 3,954,197 A * | 5/1976 | Dean | 414/800 |
| 4,062,507 A * | 12/1977 | Felder | 244/17.17 |
| 4,691,878 A | 9/1987 | Vaughan et al. | |
| 5,141,371 A * | 8/1992 | Pish | 414/229 |
| 2005/0242236 A1 | 11/2005 | Purcell | |
| 2007/0205326 A1 | 9/2007 | Waide | |

OTHER PUBLICATIONS

Beedall, R., Navy Matters/CVF Layouts (online) Jun. 18, 2006 [retrieved: Oct. 21, 2009] retrieved from internet <URL: http://fm.beedall.com/cvf5.htm> Figure under heading 1: STOVL.

* cited by examiner

*Primary Examiner*—Tien Dinh
(74) *Attorney, Agent, or Firm*—Fish & Associates, PC

(57) ABSTRACT

Substantial reduction in aircraft stowage space can be achieved by stacking aircraft using minimal or no folding of parts of the aircraft. This results in reduced complexity and reduced cost compared to other aircraft compact stowage schemes including for example fully folding an aircraft. Landing gear variable height, length, or orientation can be used to orient all or a portion of the aircraft for stowage. Alternately or in combination with such orientation by landing gear, other portions of the aircraft including tilting rotors and tilting nacelles can be oriented to achieve a geometric configuration conducive to compact stowage. In preferred embodiments, aircraft are moved relative to each other so that a portion of one aircraft is offset relative to a corresponding portion of the other. In especially preferred configurations, a portion of the first aircraft will overlap or lie on top of without touching a portion of the second aircraft.

19 Claims, 6 Drawing Sheets

COMPACT STOWAGE OF TRANSPORT AIRCRAFT

This application claims priority to U.S. provisional application Ser. No. 61/034,463, filed Mar. 6, 2008, the disclosure of which is incorporated herein by reference in its entirety.

FIELD OF THE INVENTION

The field of the invention is aircraft.

BACKGROUND

Transport aircraft are often large to contain substantial payloads. Parking and stowage of such aircraft on an airport ramp or in a hangar requires a large space that is difficult to obtain in ever more crowded airports. This difficulty is extreme when stowage of military cargo aircraft (or rotorcraft) is required in forward military bases on land or onboard a ship.

Figure 1:
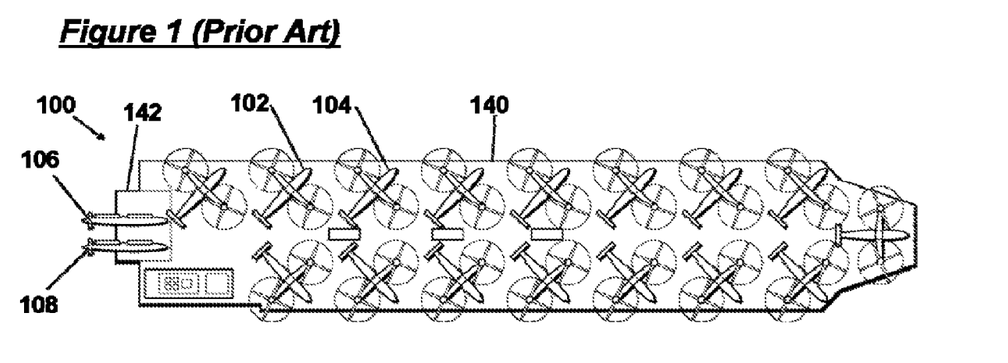
FIG. 1 is a schematic of multiple tiltrotor aircraft on the deck of a seabasing ship.

It is of military interest to consider the basing of armored vehicles and heavy transport rotorcraft on ships (called seabasing). U.S. utility patent application Ser. No. 12/342,891, filed Dec. 23, 2008, describes such a seabasing ship, which provides for the flight operations of multiple heavy transport rotorcraft. Prior art FIG. 1 depicts tiltrotor aircraft 102, 104 on the deck 140 of a ship 100. Folded aircraft 106, 108 sit on an elevator 142 at the stem of the deck 140. The option of compact folding of such heavy lift rotorcraft aircraft 102, 104 allows two, three, or even more aircraft to be moved on a ship elevator 142 and stowed in a hangar below the flight deck 140.

Figure 2:
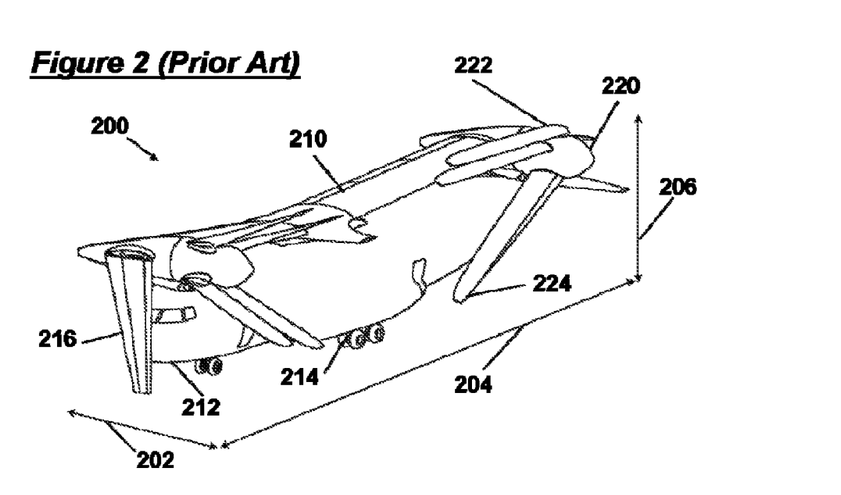
FIG. 2 is a perspective view of a fully-folding tiltrotor aircraft.

An exemplary fully folding tiltrotor aircraft is depicted in prior art FIG. 2. The tiltrotor aircraft 200 has a wing 210 positioned above the fuselage 212 that can rotate from a position perpendicular to the fuselage 212 into a position inline with the fuselage 212. The fuselage 212 is supported on landing gear 214. A first tilting rotor 220 remains in a roughly horizontal position over the fuselage 212. Folding blades 222, 224 are coupled to the rotor 220. Some additional portions of the aircraft may also fold or rotate, including an outboard wing 216 or a horizontal or vertical tail (not shown). In general, such rotating or folding joints need to sustain substantial flight loads and tend to significantly increase the aircraft weight and drag. For practical applicability, such joints need to be powered to provide aircraft folding in winds of 60 knots or higher. This requirement tends to add weight and cost to an aircraft design.

The substantial development cost, the increase in aircraft unit cost, as well as the increased aircraft weight and drag associated with a fully folding scheme as depicted in FIG. 2, raises the need for a compact stowage scheme that does not incur the penalties of the fully folding scheme. A low-impact compact stowage scheme is highly desired for stowing a higher number of aircraft on the ship deck than otherwise possible.

SUMMARY OF THE INVENTION

The present invention provides apparatus, systems, and methods by which substantial reduction in aircraft stowage space can be achieved by stacking aircraft using minimal or no folding of parts of the aircraft. This results in reduced complexity and reduced cost compared to other aircraft compact stowage schemes including for example fully folding an aircraft.

Contemplated aircraft include those equipped with landing gear of variable height, length, or orientation. Such landing gear can be used to orient all or a portion of the aircraft for stowage. Alternately or in combination with such orientation by landing gear, other portions of the aircraft including tilting rotors and tilting nacelles can be oriented to achieve a geometric configuration conducive to compact stowage.

In preferred embodiments, a first and second aircraft are moved relative to each other so that a portion of the first aircraft is horizontally and vertically offset relative to a corresponding portion of the second aircraft. In especially preferred configurations, a portion of the first aircraft will overlap or lie on top of without touching a portion of the second aircraft. This stacking scheme is contemplated for tiltrotor aircraft, wherein the offset portions might comprise tilt rotors as well as for other types of aircraft including for example fighter aircraft wherein the offset portions might comprise wings.

For storage of large quantities of vehicles, the first and second aircraft have portions including for example wings that are horizontally offset but not vertically offset relative to one another. The lack of a vertical offset implies that any number of aircraft can be stacked together in a single assemblage. The horizontal offset between aircraft or components consists of a lateral and longitudinal offset. For most compact stowage, these offsets are as small as realistically possible within the constraints of aircraft geometry and avoidance of contact between adjacent aircraft. Realistically, this might mean positioning a nose of the first aircraft forward of the nose of the second aircraft by no more than 10%, 20%, or 30% of an average length of the fuselages, and simultaneously positioning the aircraft such that the lateral offset between the aircraft is no more than 30%, 50%, or 70% of the total wing span of the aircraft. Offsets might be achieved predominantly by manipulating the landing gear or predominantly by tilting the rotor.

It is contemplated that for some aircraft geometries, portions of the aircraft might be folded. These portions might comprise a vertical tail. Ideally, folding of the main lifting surfaces of aircraft including for example main wings or blades is minimized or eliminated. In especially preferred stacking arrangements, the aircraft have a common geometry, and are transport aircraft having take-off weights of at least 50,000, 100,000, 150,000, or even 200,000 pounds.

Application of the teachings herein allows for a 100%, 200%, 300%, or even 400% increase in aircraft density set a stowage area. In especially preferred configurations, the aircraft may be positioned so that their tails overhang a body of water (for example at the edge of a ship deck) allowing even greater increases in usable ship deck area.

In resultant preferred configurations of stacked aircraft, a portion of the wing of a first aircraft will typically be placed over, but not touching, a portion of a wing of the second aircraft. In some even more compact configurations, it is contemplated that a portion of the wing of the first aircraft will be positioned above a fuselage portion of the second aircraft. In an especially preferred configuration, a third aircraft is also stacked, and a portion of a wing of the second aircraft is positioned over a portion of a wing of the third aircraft.

DETAILED DESCRIPTION OF THE INVENTION

In a preferred embodiment of a stacking and minimally folding tiltrotor aircraft, it is contemplated that a reduction in aircraft stowage space can be achieved by folding only a single element of the aircraft (a vertical fin fold), orienting aircraft in a predetermined manner, and subsequently stacking aircraft next to and partially on top of one another.

Some preferred embodiments of the invention use the aircraft height adjustable landing gear (U.S. utility patent application Ser. No. 11/473,977, filed Jun. 23, 2006) to allow tight stacking of aircraft. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

While the above patent pending landing gear provides other unique features, the height adjustability feature itself is known in the art, and is common in military cargo aircraft (called kneeling in the industry vernacular) and is used to ease loading and unloading of bulky military cargo especially on uneven ground. Additionally or alternatively, other features of the aircraft can be used to provide for the tight stowage. Examples include a tilt-rotor (nacelle and rotor) tilting 5, 10, or 15 degrees backward, and deflection upwards by 70, 80, 90, 100, or 110 degrees up of the outboard wing ailerons (U.S. utility patent application Ser. No. 11/505,025, filed Aug. 15, 2006). Unless the context dictates the contrary, all ranges set forth herein should be interpreted as being inclusive of their endpoints. Similarly, all lists of values should be considered as inclusive of intermediate values unless the context indicates the contrary.

A significant advantage of at least the preferred embodiments is that, except for the vertical fin fold, all other features of the aircraft used in preferred embodiments are already part of the original designs, and are necessary for the operations and performance of the aircraft. This is unlike prior art folding schemes in that no significant cost, weight, or complexity penalty is encountered.

Figure 3:
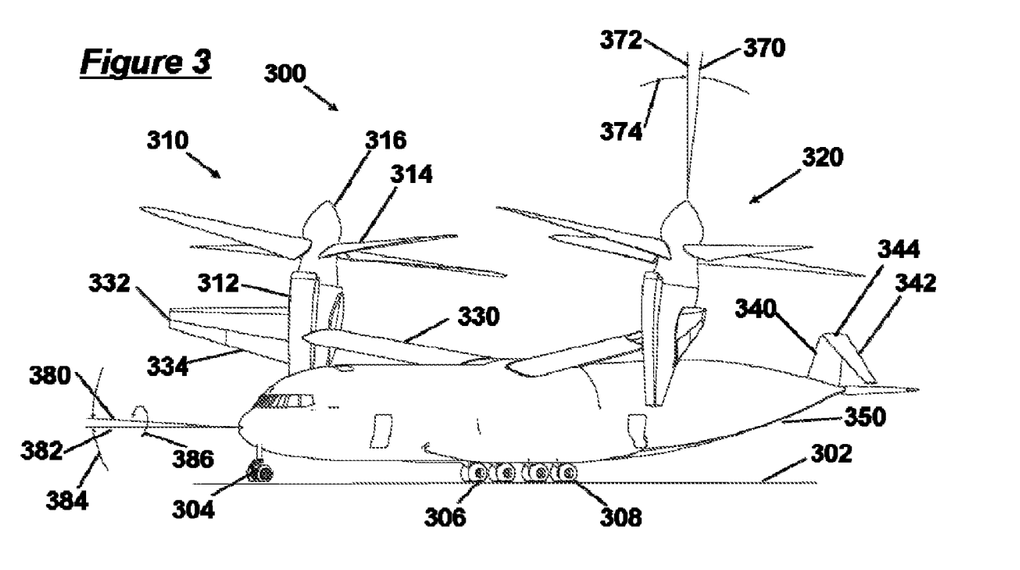
FIG. 3 is a perspective view of a preferred tiltrotor aircraft capable of stacking for compact stowage.

FIG. 3 illustrates the features of a preferred large transport tiltrotor aircraft 300 with a first rotor system 310 and a second rotor system 320 that could be stacked for compact stowage according to the present teachings. The aircraft 300 is parked or landed on a substantially flat and level landing surface 302 including for example a runway, paved area, unpaved area, flight deck, or ship deck. The aircraft 300 is supported by nose landing gear 304, right main landing gear 306, and left main landing gear 308. In preferred embodiments, the length of the nose gear 304, and main gear 306, 308 are individually adjustable so that the orientation of the fuselage 350 relative to the landing surface 302 can be changed. The pitch orientation of the fuselage 350 relative to the landing surface 302 is defined by a pitch angle 384 between a first imaginary line 380 parallel to the fuselage 350 and a second imaginary line 382 parallel to the landing surface 302. Similarly, the roll orientation of the aircraft 300 is defined by a roll angle 386 of the fuselage 350 about an imaginary line 380 parallel to the fuselage 350.

Aircraft 300 preferably has a first tilting nacelle 312 rotatably coupled to an inboard wing 330 by means of a tilt actuator and spunnion. An outboard wing 332 and deflectable outboard wing ailerons 334 are coupled to the tilting nacelle 312. In preferred embodiments, the outboard wing 332 tilts with the nacelle 312. The nacelle 312 has a tilt angle 374 that is defined as 90 degrees when an imaginary line 370 parallel with the tilting nacelle 312 is coincident with an imaginary line 372 perpendicular to the landing surface 302. The tilt angle 374 is zero when the imaginary line 370 parallel with the tilting nacelle 312 is parallel with an imaginary line 380 parallel to the fuselage 350. It is contemplated that any suitable tilt angle 374 could be used in stacking aircraft, including 70, 80, 90, 100, or 110 degrees depending on aircraft geometry. A first rotor system 310 with rotor blades 314 and a spinner 316 is coupled to the tilting nacelle 312. In this particular case, the aircraft 300 also has a vertical tail 340 with an upper portion 342 that folds about a joint 344. The tilting nacelle 312 is thus used to orient a second portion of the aircraft 300. The rotor 310 is also given an azimuthal orientation which defines in which direction the rotor blades 314 point.

Figure 4:
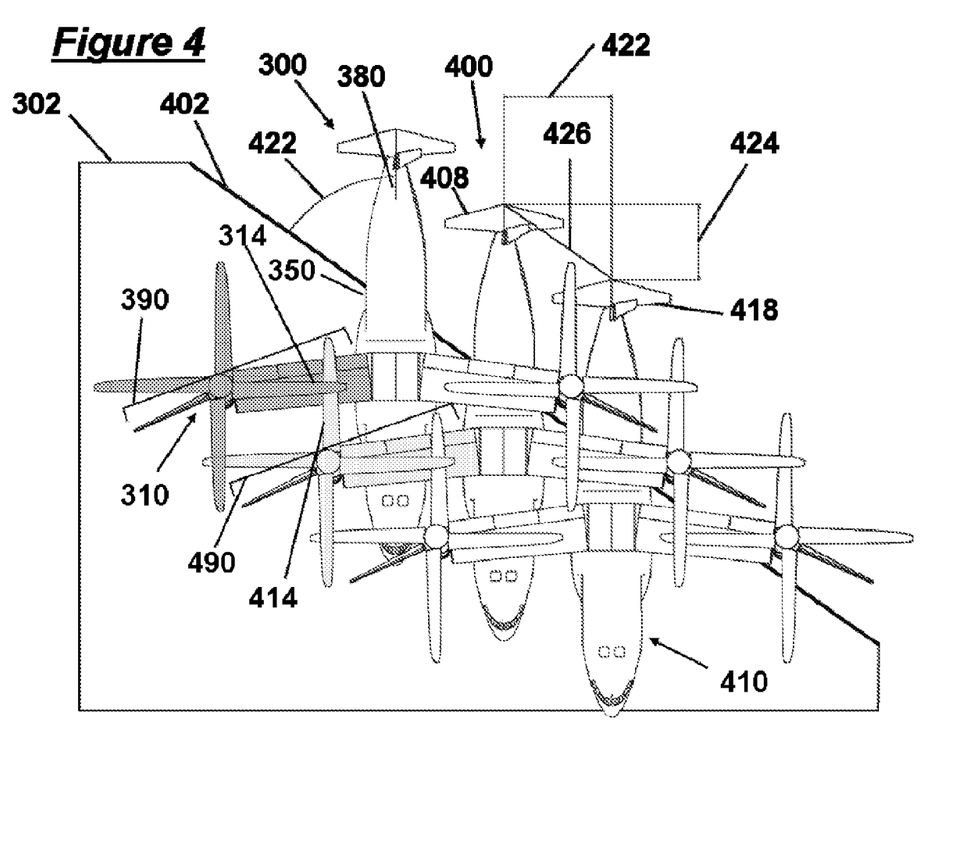
FIG. 4 is a top-view depiction of three aircraft in a preferred stacking arrangement.

FIG. 4 illustrates a preferred stacking of aircraft on a landing surface for compact stowage. A first aircraft 300 is positioned on a landing surface 302 with a yaw angle 422 relative to an imaginary reference line 402 on the landing surface 302. In practice, the reference line 402 might correspond with the boundary between a ship deck and open air above the water.

It is contemplated that any suitable method could be used to position the first aircraft 300 on the landing surface 302 including self-powered landing gear or pushing or towing the aircraft into position. Thus, the landing gear 304, 306, 308 is used orient a portion of the first aircraft; in this case the entire fuselage 350 and inboard wing 330 is oriented by these means. In preferred embodiments, the first aircraft 300 might have other orientations set as well including pitch angle 384, roll angle 386, and nacelle tilt angle 374. In especially preferred embodiments these orientations are achieved using variable height landing gear and 304, 306, 308 and tilting nacelles 312. A second aircraft 400 is oriented in a similar fashion and moved into position near the first aircraft. The stacking process may continue with a third aircraft 410, or any number of aircraft as desired. FIG. 4 illustrates the resulting compact nature of relative placement of aircraft. It can be seen that a portion 490 of the second aircraft 400 overlaps the fuselage 350 of first aircraft 300. Similarly, a blade 414 of the second aircraft 400 lies under a blade 314 of the first aircraft 300. It can be seen that the desired relative placement of stacked aircraft and stacked aircraft orientation for compact stowage depends on aircraft geometry, but would be relatively constant for different instances of one type of aircraft.

It can further be seen that aircraft in preferred stacking arrangements have lateral and longitudinal offsets. FIG. 4 depicts a second aircraft 400 and a third aircraft 410 stacked next to a first aircraft 300. It can be noted that any geometric portion including for example the tail 408 of the second aircraft 400 and the corresponding geometric portion including for example the tail 418 of the second aircraft 410 have a lateral offset 422 and longitudinal offset 424. The combined lateral offset 422 and longitudinal offset 424 can be considered the total horizontal offset 426. Similarly, a portion 390 of the first aircraft 300 is offset from a corresponding portion 490 of the second aircraft 400. In especially preferred embodiments, the offset portion 390 comprises a tilting rotor 310. Herein, "corresponding portion" of a second aircraft with respect to a first is used to refer to the part or collection of parts of the second aircraft which are substantially similar and potentially interchangeable with a part or collection of parts of the first aircraft. For example, the fuselage 450 of the second aircraft 400 is the corresponding portion to the fuselage 350 of the first aircraft 300.

Figure 5:
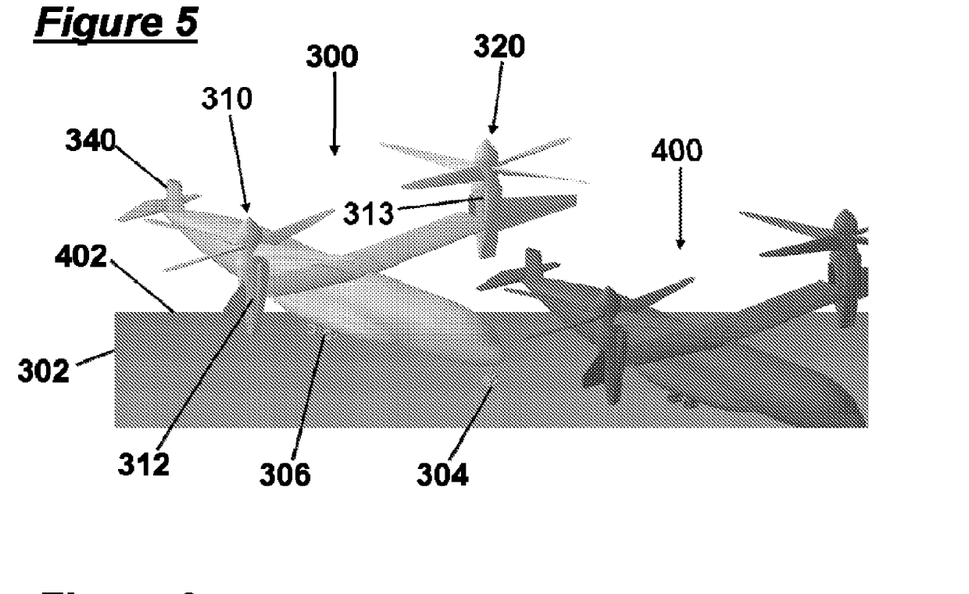
FIG. 5 depicts a first step in a sequence of stacking aircraft of FIG. 4.
Figure 6:
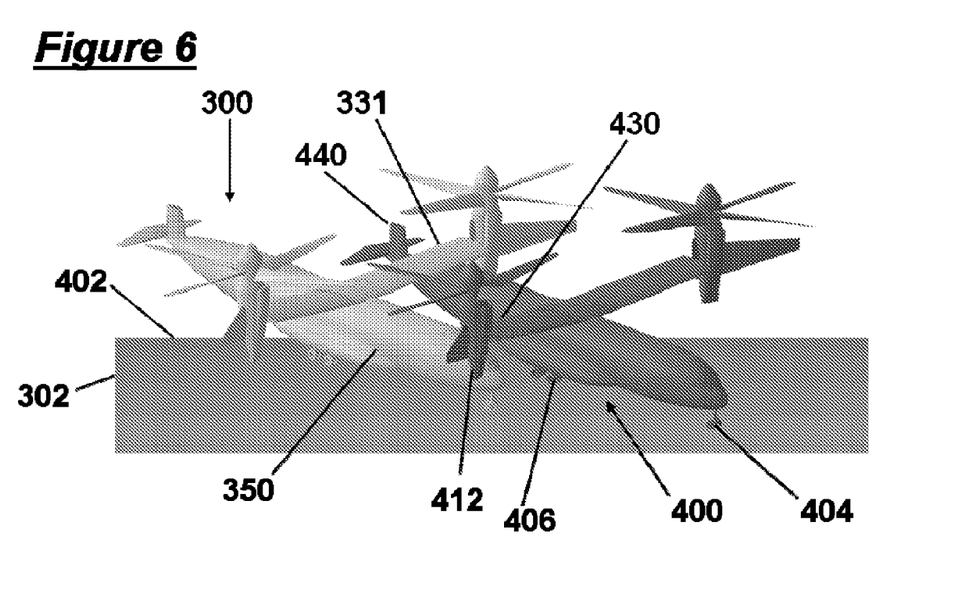
FIG. 6 depicts a second step in a sequence of stacking aircraft of FIG. 4.
Figure 7:
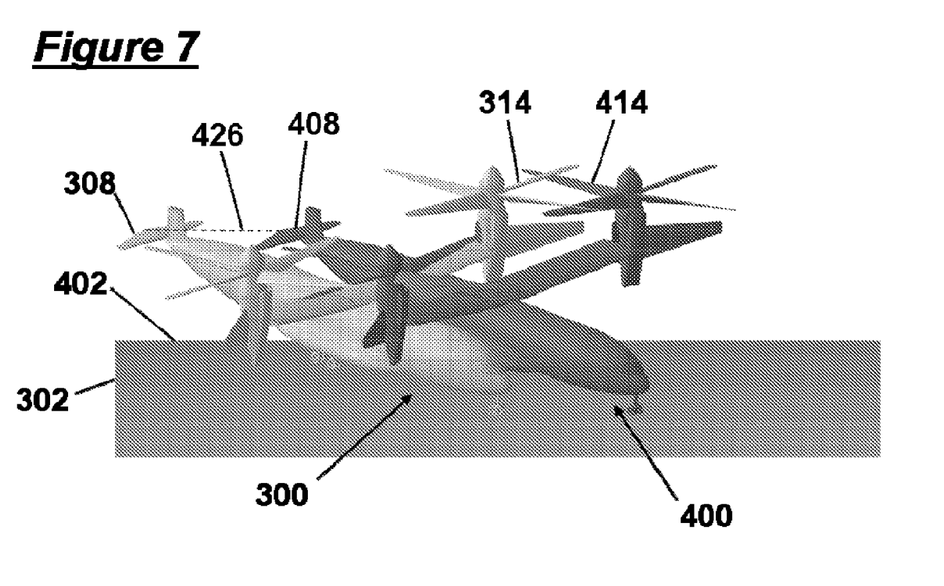
FIG. 7 depicts a stacked configuration of two tiltrotor aircraft of FIG. 4.

FIG. 5, FIG. 6, and FIG. 7 illustrate subsequent steps in a preferred stacking process of two large tilt-rotor rotorcraft aircraft. FIG. 5 depicts a first aircraft 300 parked on a landing surface 302 that is commanded and achieves a desired pitch orientation and roll orientation by adjusting variable length landing gear 304, 306. First and second rotors 310, 320 on first and second tilting nacelles 312, 313 are oriented slightly backwards. The vertical tail 340 is optionally folded. The aircraft 300 has a given yaw orientation with respect to a reference line 402, shown as a ship deck edge in this figure. A second aircraft 400 is also parked on the landing surface.

FIG. 6 shows the second aircraft 400 being maneuvered in place next to the first aircraft 300 with a yaw orientation on a ship deck landing surface 302. The second aircraft 400 is oriented with a desired orientation substantially similar to that of the first aircraft by means of adjusting the landing gear 404, 406 and tilting a tilting nacelle 412. The vertical tail 440 of the second aircraft is folded to allow it to pass under the left inboard wing 331 of the first aircraft 300. It can further be seen that the right inboard wing 430 of the second aircraft lies over the fuselage 350 of the first aircraft 300.

FIG. 7 depicts a preferred final stacked configuration of two aircraft. The second aircraft 400 now lies quite close to the first aircraft 300. In this and future instances, an aircraft being close to another in a stacked configuration means that the fuselages of first and second aircraft have lateral offsets of less than one half of the total wing span of either aircraft. The aircraft are placed such that there is a horizontal offset 426 between the first 300 and second 400 aircraft. In this and other especially preferred embodiments, there is no vertical offset between the aircraft. Overlap of portions of the aircraft is achieved by selective pitch and roll orientations. In this final stacked configuration, it can be seen that at least some of a blade 314 of the first aircraft 300 overlaps or lies over at least some of a blade 414 of the second aircraft 400. It should be noted that one property of this stacked configuration for compact stowage is that portions of the first aircraft 300, including for example the blade 314, lie over portions, including for example the blade 414 of the second aircraft 400, while at the same time, portions of the second aircraft 400, including for example the right inboard wing 430, lie over portions of the first aircraft 300, including for example the fuselage 350.

The stacking process depicted in FIG. 5, FIG. 6, and FIG. 7 can be extended to any realistic number of aircraft, from 2, 4, 6, 10, 20, 30, or even 50 or more aircraft. It is contemplated that most assemblages of aircraft would be stacked in a serial (sequential) process, and would be unstacked by reversing the same process from the opposite end of the stack of aircraft. As shown in FIG. 7, it can be advantageous to stack aircraft with their tails overhanging the edge of a flight deck. With more aircraft, this stowage position provides an approximately three fold reduction in deck area as compared to other tightly spaced parking schemes. This parking scheme provides adequate aircraft-to-aircraft separation for a rapid parking process and for aircraft movements under high winds.

Because the aircraft 300 geometry is substantially symmetrical along a vertical nose to tail plane, any parking showing the stacking of the aircraft in this order (aircraft added to the right of the prior parked one) can be reversed (add to the left). It is envisioned that both vertical fin folding and landing gear height adjustment will be powered and potentially automatically controlled. Those skilled in the art will appreciate from FIG. 5, FIG. 6, and FIG. 7 that the compactness of the stowage that could be achieved would be dependent upon the particular aircraft configuration. In addition, those skilled the art will be able to extrapolate the stacking principles depicted in this and other figures to different numbers of aircraft from that expressly shown.

Figure 8:
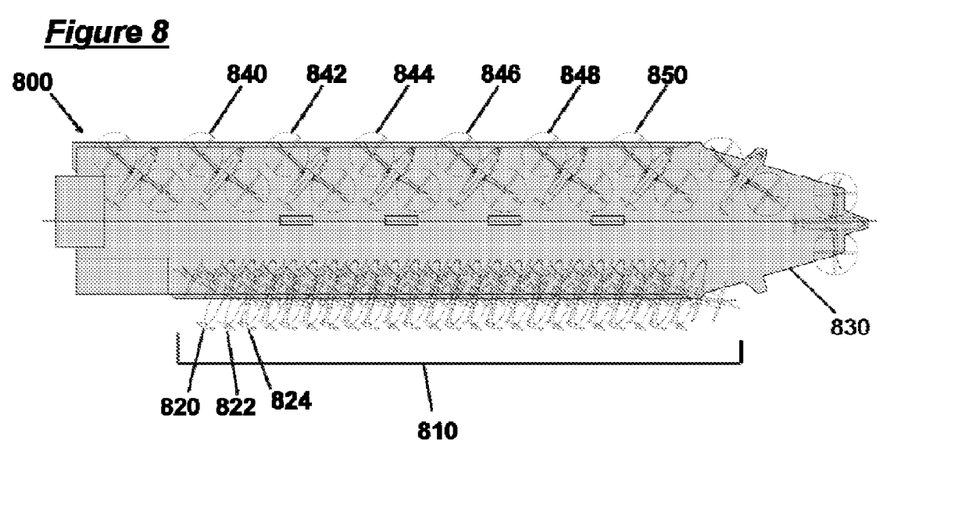
FIG. 8 is a schematic of an assemblage of multiple stacked aircraft on the deck of a ship.

FIG. 8 shows an assemblage 810 of multiple stacked aircraft 820, 822, 824 on the deck 830 of a ship 800. The assemblage 810 as shown is made up of 24 stacked aircraft. It can be seen that these aircraft take up a similar amount of deck space as six conventionally parked aircraft 840, 842, 844, 846, 848, 850. This amounts to an approximately four-fold reduction in deck space.

Figure 9:
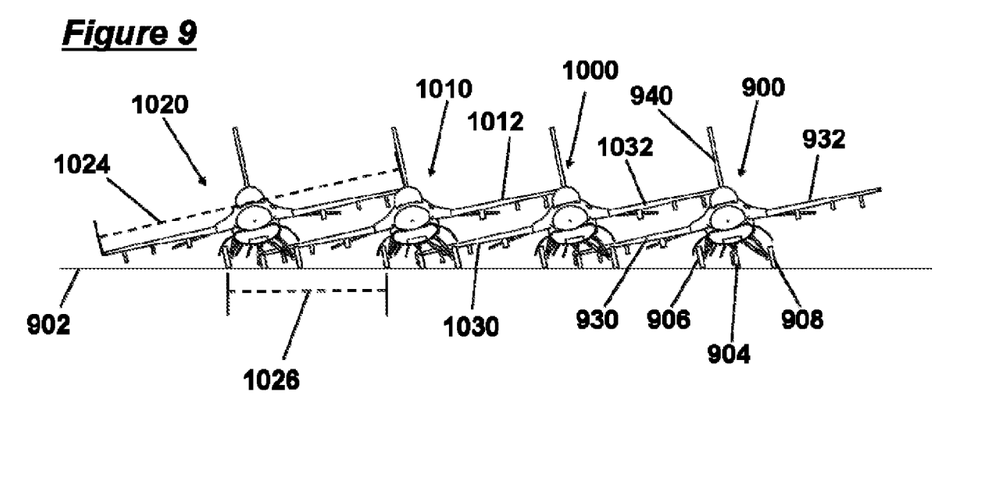
FIG. 9 is a front view of a preferred compact stowage by stacking of four fighter aircraft.
Figure 10:
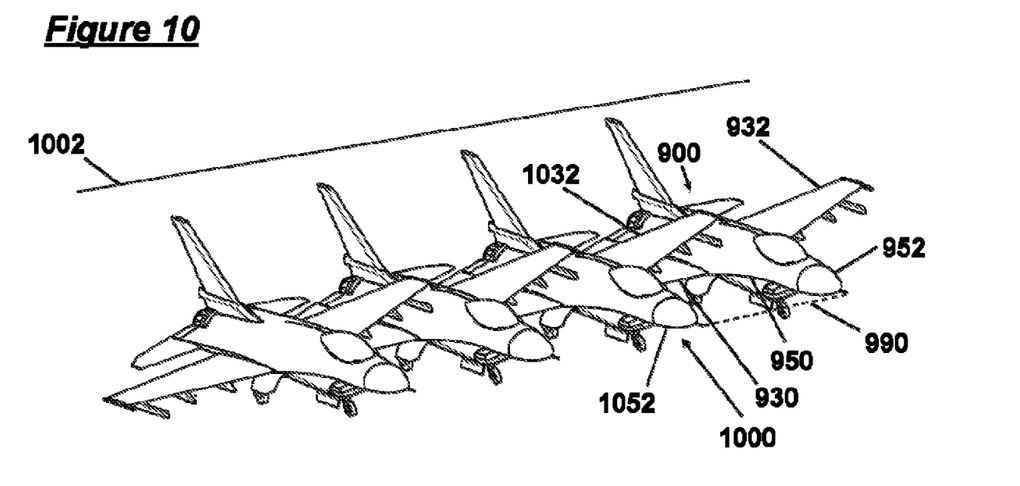
FIG. 10 is a perspective view of the same assemblage of stacked aircraft.

FIG. 9 and FIG. 10 are front-view and isometric illustrations respectively of a preferred compact stowage by stacking of four fighter aircraft. As shown in FIG. 9, a first fighter aircraft 900 is positioned on a landing surface 902. The aircraft 900 comprises a right wing 930, a left wing 932, a vertical tail 940, a right main landing gear 906, a left main landing gear 908, and a nose landing gear 904. The right or starboard landing gear 906 is lowered sufficiently and the left or port landing gear 906 is raised sufficiently to tilt the left or port wing 932 upwards and the right or starboard wing 930 downwards. This effectively gives the aircraft 900 a roll orientation. Additional aircraft 1000, 1010, 1020 are subsequently stacked for compact stowage. FIG. 9 also indicates the total wing span 1024 of an aircraft 1020 as well as the lateral offset 1026 between two stacked aircraft 1010, 1020. It can be seen that the aircraft are positioned such that the lateral offset 1026 between the aircraft 1010, 1020 is no more than 50% of the total wing span 1024 of the aircraft 1020. All suitable offsets are considered, 25%, 35%, 50%, and 60% as may be dependent on aircraft geometry.

FIG. 10 depicts the same assemblage of stacked aircraft. A second aircraft 1000 comprising a right wing 1030 and a left wing 1032 is stacked next to the first aircraft 900. The second aircraft 1000 also is seen to be tilted with a roll orientation similar to the first aircraft place such that a portion of left wing 1032 of a mediate aircraft 1000 is positioned above a wing 930 (or even fuselage 950) of a first adjacent aircraft 900, and a portion of the other wing 1030 of mediate aircraft 1000 is positioned below the wing 1012 of a second adjacent aircraft 1010. Here again, a major advantage is that the stacking can be achieved without any modifications to the existing design. In this case, no fold of the vertical tail 940 or any other part of the aircraft is required. The nose 952 of the first aircraft 900 can be seen to have a total horizontal offset 990 with respect to the nose 1052 of the second aircraft. As previously described, the horizontal offset 990 is made up of a lateral offset 1026 and longitudinal. In FIG. 10, the aircraft are moved or positioned to achieve a lateral offset such that the nose 952 of the first aircraft 900 forward of the nose 1052 of the second aircraft 1000 by no more than 20% of an average length of the fuselages 950, 1050.

Of course, one of ordinary skill in the art will appreciate that the aircraft can be tilted by any configuration in which one of the landing gears is disposed higher than the other. Thus, the term "using a variable height landing gear on each of a first and a second aircraft to tilt the first and second aircraft" should be interpreted to mean lowering one of the landing gears more than the other, raising one of the landing gears more than the other, raising one and lower the other, blocking one of the landing gears higher than the other to effectively raise that landing gear, providing a depression in the deck or other surface to effectively lower one landing gear, and so forth.

Methods of stacking aircraft are therefore contemplated that comprise using at least one of tilting a rotor and variable height landing gear to tilt at least a portion of a first aircraft; and moving at least one of the first and second aircraft such that the portion of the first aircraft is vertically and horizontally offset relative to a corresponding portion of a second aircraft.

While contemplated methods can be used to stack aircraft parts and partially assembled aircraft, such methods are particularly contemplated to be useful for "landed" aircraft, which are defined herein to mean aircraft that have flown, and are capable of independent sustained flight upon proper unstacking and other readying procedures.

All practical offsets are contemplated, but in the case of tilt rotors the offset will most likely be both horizontal and vertical, and in the case of wings the offsets will most likely be horizontal but not vertical. Also in most cases it is likely that the tail of at least one of the aircraft will be foldable.

Methods contemplated herein are useful for both rotorcraft and non-rotorcraft. For example, a contemplated method of stacking first and second landed aircraft, comprises: using a variable height landing gear on each of a first and a second aircraft to tilt the first and second aircraft; and moving at least one of the first and second aircraft such that a lateral portion of a wing of the first aircraft is positioned over a portion of a wing of the second aircraft. In especially preferred such embodiments, the lateral portion of the wing of the first aircraft is positioned above a fuselage portion of the second aircraft. Additionally it should be appreciated that these "kneeling" methods can be applied to three or more aircraft, rather than just two, and are especially applicable to fighter aircraft.

Although the methods described herein are feasible with many different types of aircraft, the methods are preferably applied to aircraft of the same type, or at least those having a common geometry. The methods can be especially useful where the aircraft being stacked are large transports, defined herein to mean those having take-off weights of at least 100,000 pounds.

Depending on the type of aircraft being stacked, contemplated stacking methods can achieve at least a 50%, 75%, 100%, 150% or even a 200% increase in aircraft density within a ship's deck, ship's hanger, or other stowage area. In some cases such increase can be achieved at least predominantly by tilting the rotor, and in other cases the increase can be achieved at least predominantly by manipulating the landing gear. On a ship, additional efficiency can be achieved by positioning the tail of one or more of the stacked aircraft so that their tails overhang the water.

Viewed from another perspective, preferred methods of increasing aircraft density on a ship comprise: landing first and second aircraft on the ship, each of the aircraft having a fuselage; positioning a nose of the first aircraft forward of the nose of the second aircraft by no more than 20% of an average length of the fuselages; positioning sides of the fuselages at a distance of no more than 10% of an average maximum width of the fuselages; and all without relying on folding of lifting surfaces of the first and second aircraft. Here again, contemplated methods include those in which the aircraft have rotors, and the aircraft are stacked such that the rotors have at least some vertical and horizontal offset relative to one another.

A very significant advantage of at least some of the contemplated methods is that a military, government, or other entity can reduce cost by: increasing density of aircraft in a storage area by stacking the aircraft without relying on folding of lifting surfaces. As mentioned above, the tails of the aircraft may well be folded, but the portions of the tail being folded will likely not include lifting surfaces.

Of course, care must be taken to avoid one aircraft damaging another. In that regard it is contemplated that contemplated spacings can be used that largely or completely prevent the stacked aircraft from touching one another other when subjected to an expected wind, for example a wind speed of more than 25, 50, or 75 knots.

Contemplated aspects of cost reduction include reducing at least one of a life cycle cost, an operational cost, and a complexity cost of the stacked aircraft. Contemplated cost reductions in one or more of these categories can be at least 5%, 10, or 15%. Further contemplated improvements can arise from reducing personnel costs involved with storing the aircraft, and readying the aircraft for flight. Still further contemplated improvements can arise from reducing operational costs of transporting armor to a transport vessel, a fixed location staging area, a battlefield, or other operational area.

Thus, specific embodiments and applications of compact stowage of transport aircraft have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of stacking first and second landed aircraft, comprising:
   configuring the first and second aircraft to be landed on a substantially flat and level landing surface;
   varying the length of a landing gear to orient the first aircraft; and
   moving at least one of the first and second aircraft such that a portion of the first aircraft is horizontally and vertically offset relative to a corresponding portion of the second aircraft to achieve increased aircraft density within a stowage area, when both aircrafts are on the substantially flat and level landing surface.

2. The method of claim 1, wherein the offset portions comprise tilt rotors.

3. The method of claim 1, wherein the offset portions comprise wings.

4. The method of claim 1, wherein the first aircraft has a first wing that is at least partially disposed under a wing of the second aircraft.

5. The method of claim 1, wherein the first aircraft has a wing that is laterally and longitudinally offset relative to a wing of the second aircraft.

6. The method of claim 1, further comprising folding a vertical tail of at least one of the aircraft.

7. The method of claim 1, wherein the first and second aircraft have a common geometry.

8. The method of claim 1, wherein each of the first and second aircraft are transports having take-off weights of at least 100,000 pounds.

9. The method of claim 1, further comprising moving the aircraft to achieve a 100% increase the aircraft density within the stowage area.

10. The method of claim 1, further comprising moving the aircraft to achieve a 200% increase in the aircraft density within the stowage area.

11. The method of claim 1, the first and second aircraft each have first and second rotors, and wherein the offset is achieved at least predominantly by at least one of the rotors.

12. The method of claim 1, wherein the offset is achieved at least predominantly by manipulating the landing gear.

13. The method of claim 1, wherein the first aircraft has a tail, and further comprising positioning the first aircraft so that the tail overhangs a body of water.

14. A method of increasing aircraft density on a ship, comprising:
   landing first and second aircraft on the ship, each of the aircraft having a fuselage;
   positioning a nose of the first aircraft forward of the nose of the second aircraft by no more than 20% of an average length of the fuselages;
   positioning the aircraft such that a lateral offset between the aircraft is no more than 50% of the total wing span of the aircraft; and
   all without relying on folding of lifting surfaces of the first and second aircraft.

15. The method of claim 14, further comprising tilting rotors of the first and second aircraft such that the rotors have at least some vertical and horizontal offset relative to one another.

16. A method of stacking first and second landed aircraft, comprising:
   configuring the first and second aircraft to be landed on a landing surface;
   using a variable height landing gear on each of a first and a second aircraft to orient an aspect of the first and second aircraft; and
   moving at least one of the first and second aircraft such that a lateral portion of a wing of the first aircraft is positioned over a portion of a wing of the second aircraft to achieve increased storage density, when both aircrafts are on the substantially flat and level landing surface.

17. The method of claim 16, wherein the lateral portion of the wing of the first aircraft is positioned above a fuselage portion of the second aircraft.

18. The method of claim 16, further comprising using a variable height landing gear on a third aircraft to tilt the third aircraft, and moving at least one of the second and third aircraft such that a lateral portion of a wing of the second aircraft is positioned over a portion of a wing of the third aircraft.

19. The method of claim 16, wherein the first and second aircraft are fighter aircraft.

* * * * *